United States Patent [19]

Federico et al.

[11] Patent Number: 4,631,355
[45] Date of Patent: Dec. 23, 1986

[54] TELAUTOGRAPH SYSTEM

[75] Inventors: Joseph Federico, Berkeley Heights; Sigurd G. Waaben, Princeton, both of N.J.

[73] Assignee: AT&T Bell Laboratories, Murray Hill, N.J.

[21] Appl. No.: 682,780

[22] Filed: Dec. 18, 1984

[51] Int. Cl.[4] .............................................. G08C 21/00
[52] U.S. Cl. ................................... 178/18; 178/19
[58] Field of Search .......................... 178/18, 19, 20

[56] References Cited

U.S. PATENT DOCUMENTS

| | | | |
|---|---|---|---|
| 3,911,215 | 10/1975 | Hurst et al. | 178/18 |
| 4,071,689 | 1/1978 | Talmage et al. | 178/18 |
| 4,121,049 | 10/1978 | Roeber | 178/18 |
| 4,198,539 | 4/1980 | Pepper | 178/18 |
| 4,214,122 | 7/1980 | Kley | 178/18 |
| 4,293,734 | 10/1981 | Pepper, Jr. | 178/18 |
| 4,456,787 | 6/1984 | Schlosser et al. | 178/19 |

Primary Examiner—Stafford D. Schreyer
Attorney, Agent, or Firm—David I. Caplan

[57] ABSTRACT

The position (XY coordinate) of a pointed stylus on a conductive sheet is determined by injecting current from the stylus into the sheet and measuring the current responses at three or more spaced apart electrodes connected to the sheet.

8 Claims, 6 Drawing Figures

U.S. Patent  Dec. 23, 1986  4,631,355
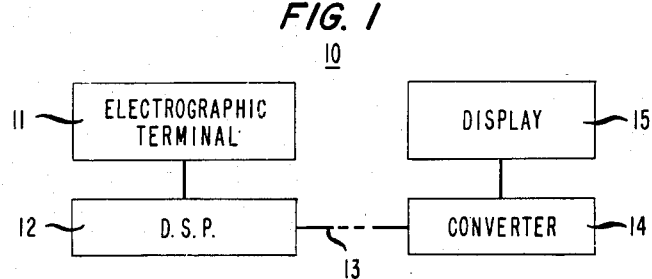
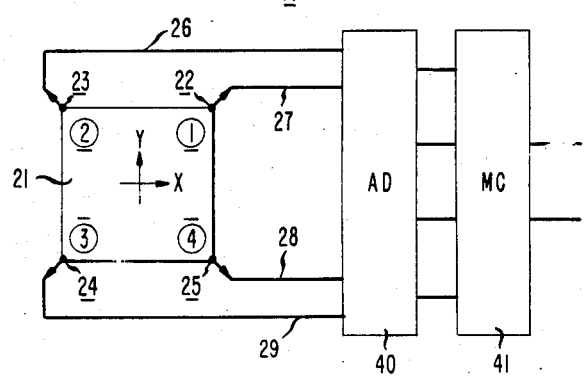
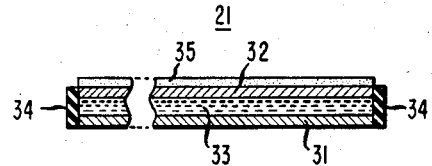 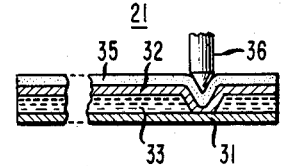
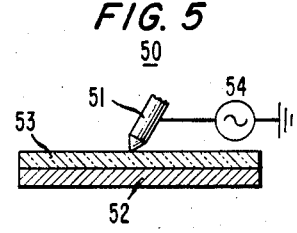 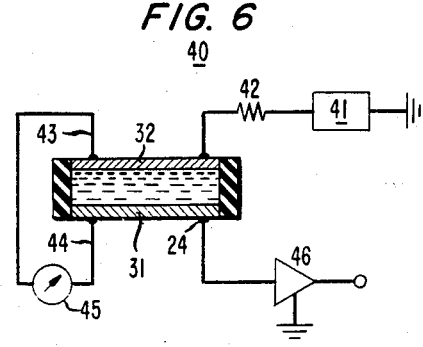

TELAUTOGRAPH SYSTEM

BACKGROUND OF THE INVENTION

This relates to a system for transmitting information.

There is a need for an inexpensive system for transmitting information, such as handwriting, sketching, and the location of a point in real time so that, for example, such handwriting or sketching can be displayed in conjunction with a telephone conversation.

SUMMARY OF THE INVENTION

The invention is a novel system to this end and involves apparatus for deriving, for transmission, electrical signals which define successive contact points as a subscriber writes or sketches on a terminal pad.

A feature of the apparatus is a novel electrographic terminal which includes a conductive sheet or pad, typically rectangular with four corners with a separate electrical terminal at each corner. Writing on this conductive sheet is made to inject a current into the sheet at a localized point and different portions of this current are collected at each of the terminals. These different portions are supplied to a signal processor programmed to process these currents in a prescribed fashion and to provide a pair of currents, preferably in digital form, uniquely determinative of the location of the injection point. This ability to provide a measure of the location of a point has a variety of applications, some of which are discussed later.

It is characteristic of the signal processor that the currents developed are dependent essentially only on various combinations of the different measured currents and little dependent on their individual values. This eliminates the need for careful control of the amount of current injected into the conductive sheet, which significantly contributes to the effectiveness of this system.

Advantageously, the novel apparatus is designed so that the conductive sheet underlies a support for a recording medium, such as a piece of paper, so that as the user writes on the conductive surface there remains a visible record of the writing on the paper for reference as the user discusses the writing.

Alternatively, the novel apparatus may be designed to be transparent and then laid over a sketch to be transmitted or referred to.

There are several ways for injecting current into the conductive sheet at points corresponding to the writing.

The preferred mode involves spacing a second conductive sheet or surface above the first conductive sheet provided with the measuring electrodes. The two sheets are spaced apart and maintained at different potentials, advantageously d-c potentials, and the pressure of writing brings the two sheets into electrical contact at the point of pressure. Accordingly, current flows in the lower sheet and signals are generated at the four electrodes, which signals can be processed by electrical circuitry to provide information about the writing. The two conductive sheets are arranged so that contact is limited to the point of pressure and lasts only as long as such pressure is maintained. Such an arrangement can be facilitated by including in the space between the two conductive sheets suitable spacers and providing appropriate elasticity in the upper conductive sheet, being deflected by the writing pressure, and rigidity in the lower conductive sheet.

An alternative arrangement uses only a single conductive sheet. In this case, if a recording medium is to be included the writing tool is supplied with alternating current so that its tip can serve to inject current capacitively into the conductive sheet as the tip is pressed into the paper or recording medium, despite the fact that the paper is an insulator for direct currents. If the writing tool is used to inject d-c current into the conductive sheet directly, d-c power may be supplied.

At the receiving end, the system typically would include a terminal for displaying the writing. The terminal can be of known kind. Typically, it may include a cathode-ray tube, advantageously provided with memory for storing the signals to permit refreshing the display to maintain the writing displayed on the tube screen as long as it is needed. It can be appreciated that the image on the cathode-ray screen may readily be scaled either up or down in size relative to the original writing.

An important feature of the invention is the algorithm used to convert continuously the four electrode signals into a pair of signals which represent two-dimensional coordinates of the writing information.

BRIEF DESCRIPTION OF THE DRAWING

The invention will be better understood from the following more detailed description taken with the accompanying drawing in which:

FIG. 1 shows in block form the basic elements of a telautographic system;

FIG. 2 shows the basic structure of an electrographic terminal in accordance with the invention for use in the system shown in FIG. 1;

FIGS. 3 and 4 are cross-sectional views of the recording portion of one embodiment of an electrographic terminal of the kind depicted in FIG. 2;

FIG. 5 is a cross-sectional view of the recording portion of an alternative embodiment of an electrographic terminal of the kind depicted in FIG. 2; and FIG. 6 illustrates schematically a circuit arrangement which can be used to provide intensity control.

DETAILED DESCRIPTION

With reference now to the drawing, FIG. 1 shows the basic elements of a typical telautographic system 10 comprising a transmitting end including an electrographic terminal 11 which develops electrical signals for supply to a digital signal processor 12 which transforms the received signals to a form suited for transmission. The signals developed are transmitted via suitable transmission means 13 to the receiving end where they are to be utilized. An advantage of this system is that telephone lines should be adequate for the transmission of the writing signals, making such transmission inexpensive.

Of course, alternatively, it is feasible to transmit to the receiving end the four analog currents derived from the four electrodes of the electrographic terminal and to do all the signal processing at the receiving end.

At the receiving end, the transmitted signals are supplied to a converter 14 whose output are the two-dimensional signals useful to reproduce in the display 15 the writing pattern introduced to the electrographic terminal 11 of the transmitting station.

FIG. 2 shows in more detail the basic elements at the transmitting end, particularly the electrographic terminal 11. It includes the writing pad 21 whose construction is better appreciated from the cross-sectional views shown in FIGS. 3 and 4. This pad includes a lower or bottom conductive sheet 31 which is relatively rigid and can be of a suitable conductive material. The sheet as shown is square, for example, 12 by 12 inches, and electrode terminals 22, 23, 24, and 25 are provided at its four corners or vertices. Overlying the bottom sheet is a second conductive sheet 32 which is relatively flexible. The space between the two sheets, typically a few mils, is filled with a suitable insulator 33, advantageously a liquid, which is relatively incompressible and of high resistivity, since it is important to maintain the two sheets electrically isolated in their normal unstressed state. A frame member 34 supports the two sheets 31, 32 electrically isolated and also encloses the fluid 33 to prevent its leakage. In the typical use, a paper 35 would be placed over the top sheet 32 and the writing to be transmitted would be impressed on the paper with a suitable writing tool, such as a pencil 36 (shown in FIG. 4). The pressure of the pencil on the writing paper would be transmitted to the top flexible sheet 32, leading to its deflection at the point of pressure into contact with the lower or bottom sheet 31, as depicted in FIG. 4. Contact between the two sheets is made to complete a circuit so that current flows. The current in the lower sheet divides between the four terminals 22, 23, 24, and 25 in proportions determined by the location of the point of current injection. Accordingly, by measuring and combining appropriately the currents at the four electrodes, there can be derived information as to the contact point in the form of a pair of signals, advantageously the X-Y rectangular coordinates, although other coordinate systems are also feasible. These signals can be transmitted to the receiving station for use in retracing the writing on a display.

Advantageously, the contact of the two sheets is made to close a circuit 40, of the kind depicted in FIG. 6, which includes a substantially constant current source 41 in series with a relatively high resistance 42. Each of the four electrodes supplies a separate low input impedance operational amplifier, although in FIG. 6 only one electrode terminal 24 is shown supplying amplifier 46. In some instances, it may prove advantageous to connect a diode in shunt between the two sheets 31, 32 to avoid excessive buildup of electrostatic charge between the two sheets which can give rise to undesirable transients at the moment of contact.

The apparatus described is relatively little affected by the resistivities of the two contacting members so long as adequate current for sensing is permitted to flow. A total current in the range of one milliampere has been found convenient; of course, other currents can be used. In some instances where the insulator between the two conductive sheets leaves a high resistance residue that needs to be broken down to avoid an ill-defined series resistance, it may be preferable to include as the current supply a series combination of a d-c and an a-c source, the d-c source providing a bias to break down the residue and the a-c source providing the current to be measured. Moreover, the current distribution is relatively unaffected by the amount of pressure applied to make contact, although such amount normally will affect the contact resistance, the resistance being inversely related to the pressure. This makes feasible gradations in the intensity level in the reproduced images, if desired, by the amount of pressure applied. In particular, continuous measurement of the contact resistance by measuring the voltage drop across the contact and use of such measurement to control the intensity of the cathode-ray beam used in the display permits changes in intensity in selected parts of the reproduced image. In FIG. 6, this is depicted schematically by electrodes 43 and 44 connected to the top and bottom sheets and between which is connected the voltmeter 45.

It should be evident that a variety of techniques are available for maintaining the two conductive sheets spaced apart in the rest or unpressed state. For example, it is feasible to fill the space with movable microspheres which are temporarily pushed aside by the pressure of writing to permit contact but return to provide separation after the pressure is relieved. Alternatively, the space may include small rubber pedestals which, for example, are fixed to the bottom sheet and support the top sheet spaced from the bottom in the rest state but yield enough to permit localized contact as the top sheet is pressed. Alternatively, it is feasible to use for the pedestals a rubber, or similar material, which is impregnated with metal particles such that the pedestal is highly resistive when unstressed but more conductive when stressed. In such an embodiment, pressure applied to a pedestal makes it conductive so that it serves to interconnect the top and bottom sheets without need for other physical contact between the top and bottom sheets. The spacing and transparency of the pedestals are arranged not to impede excessively the transparency of the pad if transparency is desired.

As a further alternative, it is feasible to introduce a photoconductive layer intermediate between the two conductive sheets whose conductivity is low in the dark but high where irradiated. By use of a light pen, i.e., a pen which includes a light emitting diode in its tip, conduction between the two sheets can be localized to the spot where irradiation makes the photoconductive layer locally conductive. If desired conductive spacers may be used to support the photoconductive layer which can be simply a coating on the underside of the top conductive sheet.

In particular, it is found that if the central point of the square, i.e., the point of intersection of its two diagonals, is regarded as the origin, the coordinates of a point of contact $X_p$, $Y_p$ may be derived as follows.

Let the four currents measured at the four corner electrodes be designated as $I_1$, $I_2$, $I_3$, and $I_4$.

Since it is desirable to tolerate a certain degree of nonuniformity both of the conductivity of the sheets over their area and of the contact resistance of the four electrode connections to the sheet, for example, about ± ten percent from the average in each case, the firt step in the computational process is a zero setting calibration step. This involves setting the writing stylus at the origin or intersection of the two diagonals to make contact there between the two conductive sheets. There is then measured the currents at the four electrodes for this setting, $I_1^*$, $I_2^*$, $I_3^*$, and $I_4^*$ and there is derived the average current $I_A^*$ equal to $$(I_1^* + I_2^* + I_3^* + I_4^*)/4 \tag{1}$$

There are then derived four correction factors $C_1$, $C_2$, $C_3$ and $C_4$ for the four currents measured at the four electrodes equal to $$I_1^*/I_A, I_2^*/I_A, I_3^*/I_A \text{ and } I_4^*/I_A, \tag{2}$$

respectively, which in subsequent computations will be used to weigh the subsequently measured currents $I_1$, $I_2$, $I_3$, and $I_4$. Typically these quantities will vary between 0.95 and 1.05. If the resistivity of the bottom conductive sheet were completely uniform, and the four electrode contact resistances equal, then $I_1^*$, $I_2^*$, $I_3^*$ and $I_4^*$ would be equal and $C_1$, $C_2$, $C_3$ and $C_4$ would be unity. It is generally desirable to arrange the design so that these factors do not vary from unity by much more than ±5 percent.

For subsequent computations, it will be convenient to use the normalized sum $S_N$ of the four currents given by $$I_1C_1 + I_2C_2 + I_3C_3 + I_4C_4. \qquad (3)$$

From the measured values of current, after correction, there then is derived $X_0$ and $Y_0$ which are a measure of the two coordinates of the contact point where $$X_0 = (I_1C_1 - I_2C_2 - I_3C_3 + I_4C_4)/S_N \qquad (4)$$

and $$Y_0 = (I_1C_1 + I_2C_2 - I_3C_3I_4C_4)/S_N. \qquad (5)$$

It has been found important also to provide an astigmatic correction in each of the two orthogonal directions. The first correction results in the quantities $X_1$ and $Y_1$ where $$X_1 = X_0/(1 + aY_0^2 + cX_0^2) \qquad (6)$$

$$Y_1 = Y_0(1 + aX_0^2 + cY_0^2), \qquad (7)$$

and the second correction leads to the fully compensated values $X$ and $Y$ where $$X = X_1(1 + bX_1^2) \qquad (8)$$

$$Y = Y_1(1 + bY_1^2). \qquad (9)$$

The coefficients a, b and c are best derived empirically for a particular geometry and once derived can be expected to remain uniform. Typical values of a, b, and c for a square sheet are 5.5, 1.5, and −2, respectively.

There are two possible approaches for doing the prescribed computations. One approach is to devise analog circuitry including appropriate combinations of operational amplifiers and resistive ratio networks finally to derive analog X and Y signals. This proves difficult in practice.

Our preferred approach is to operate in a digital mode. This approach involves sampling, essentially simultaneously, each of the four signals derived at the four terminals at an appropriate sampling rate, and then digitizing each of the four samples. This approach is illustrated in FIG. 2 by providing for the currents measured at the four electrodes to be supplied by leads 26, 27, 28, and 29 to the A-D converter 100 for conversion to four digital signals. These four signals, in turn, are supplied to a signal processor 101 which operates on the signals in accordance with the relations set forth above for providing the desired X and Y signals in digital form for each set of measured currents. These in turn typically would be supplied to circuitry for conversion into signals appropriate for transmission. Because successive samples normally change slowly, various bandwidth reduction techniques, such as delta modulation, can advantageously be employed to facilitate transmission.

At the receiving station, these received signals would be processed to recover the X and Y coordinate signals for use in deflecting the beam of the cathode-ray tube appropriately to reproduce as a display on the tube screen a replica of the writing initially made on the paper.

At the present state of display technology, a cathode-ray tube display doubtlessly is the most readily available. However, other forms of displays, such as a light-emitting diode display or liquid crystal display, are also feasible.

FIG. 5 illustrates a different form of electrographic terminal 50 in which writing is done with a special stylus 51 which also serves as a means for injecting current into the base conductive sheet. In this instance, the electrographic terminal basically comprises only the base sheet 52 similarly provided with terminals at each of its vertices. The paper 53 to be written on would be placed directly over this sheet. The tip of the stylus 51 would be powered by an alternating voltage source 54 of a frequency sufficiently high, for example, 100 kHz, that, as the stylus tip is pressed to the paper for writing, a capacitive current flows between the tip and the conductive sheet 52, which current redistributes itself on the sheet and flows to the four electrodes. As before, the relative distribution of the current flow to the four electrodes provides a measure of the location of the injected current.

In another possible modification, the electrographic terminal is adapted to be positioned over a sketch or writing to be transmitted, and this sketch is traced by the pencil or stylus to transmit a tracing of the sketch. In this instance, it is important that the conductive sheet or sheets be transparent to permit the tracing.

In another modification, the role of the bottom conductive sheet could be served by a coating deposited over the faceplate of an electronic display, and one or more selected points on this display can be transmitted to a receiving station by contacting such points in a fashion to inject current into the coating.

It can be appreciated that an electrographic terminal useful in the invention can use a variety of materials for forming the conductive sheets, depending on the way the terminal is to be used. Similarly, the conductive sheets can take a variety of other shapes, for example, rectangular or circular. Moreover, while four is the preferred number of current portions measured and combined for locating the contact point, the combination of three portions theoretically is enough to fix uniquely each point on the writing pad. The same considerations indicate that when four current portions are used, they need not be derived from four corners. However, such variations require considerably more complex correction for current normalization, sheet conductivity nonuniformities and astigmatic aberration.

It also should be apparent that a terminal in accordance with the invention is useful wherever it is necessary to transmit information about the coordinates of a particular point. Accordingly, such a terminal can be useful for controlling the location of a cursor on the display screen of a computer display, much as a "mouse" does now.

Still another application of the invention is to locate a conductive sheet under a membrane touch panel of the general kind described in U.S. Pat. No. 4,484,038, which issued Nov. 20, 1984, and to use the touching of keys to inject a current into a corresponding portion of the conductive sheet and to use the distribution of currents between electrode connections to the conductive sheet to provide a signal dependent on the particular key selected.

What is claimed is:

1. A terminal comprising
   (a) first large area conductive means provided with at least three spaced apart localized electrode connections thereto,
   (b) means under control of recording information for injecting current into a point in the first conductive means for flow in the first conductive means and for dividing among said at least three electrodes and supplying a separate portion of the current to each of said at least three electrodes, and
   (c) signal processing means, supplied with the separate current portions from at least the three electrodes, for processing the at least three current portions and deriving a pair of signals representative of the coordinates of the injection point.

2. A terminal in accordance with claim 1 in which the large area conductive means is essentially rectangular and is provided with a fourth localized electrode connection thereto, a separate one of the electrode connections thereto being localized at each of its four corners.

3. A terminal in accordance with claim 1 which further includes a second large area conductive sheet which while inactive is spaced opposite and electrically isolated from the first conductive means and is deformable under localized pressure for forming a localized injection point into the first conductive sheet.

4. A terminal in accordance with claim 3 which includes means for measuring the voltage drop across the localized injection point as a measure of the localized pressure.

5. A terminal in accordance with claim 1 which further includes movable conductive means for scanning the large area conductive means for injecting current therein at the localized point.

6. A terminal in accordance with claim 5 in which the injected current is alternating current and is injected capacitively.

7. A terminal in accordance with claim 2 in which the signal processing means includes means for current normalization, reducing the effect of nonuniformities in the large area conductive means and differences in the contact resistance of the electrodes thereto, and orthogonalization of astigmatic aberration.

8. A terminal in accordance with claim 7 in which the signal processing means provides also analog to digital conversion.

* * * * *